(12) United States Patent
Hudson

(10) Patent No.: US 6,396,533 B1
(45) Date of Patent: May 28, 2002

(54) SECURITY CONTROL SYSTEM

(75) Inventor: John Hudson, Farnborough (GB)

(73) Assignee: Sony United Kingdom Limited, Weybridge (GB)

(*) Notice: Subject to any disclaimer, the term of this patent is extended or adjusted under 35 U.S.C. 154(b) by 0 days.

(21) Appl. No.: 09/153,468

(22) Filed: Sep. 15, 1998

(30) Foreign Application Priority Data

Sep. 17, 1997 (GB) ............................................. 9719799

(51) Int. Cl.$^7$ ................................................. H04N 7/18
(52) U.S. Cl. ........................ 348/154; 345/803; 345/821
(58) Field of Search ................................ 348/143, 148, 348/140, 150, 152, 153, 154, 155, 156, 159; 345/821, 803

(56) References Cited

U.S. PATENT DOCUMENTS

| 4,369,467 | A |   | 1/1983 | Smith ........................ 348/212 |
| 4,992,866 | A | * | 2/1991 | Morgan ...................... 348/159 |
| 5,625,410 | A | * | 4/1997 | Washino et al. ............ 348/154 |
| 5,682,207 | A | * | 10/1997 | Takeda et al. .............. 348/568 |
| 6,069,653 | A | * | 5/2000 | Hudson ...................... 348/143 |

FOREIGN PATENT DOCUMENTS

| EP | 0 690 628 A1 | 1/1996  | ............ H04N/7/18 |
| EP | 0 762 753 A2 | 3/1997  | ............ H04N/5/45 |
| GB | 2 275 585 A  | 8/1994  | ............ H04N/5/45 |
| WO | WO 94/24813  | 10/1994 | ............ H04N/7/18 |
| WO | WO 96/31984  | 10/1996 | ............ H04N/7/18 |

* cited by examiner

*Primary Examiner*—Howard Britton
(74) *Attorney, Agent, or Firm*—Frommer Lawrence & Haug LLP; William S. Frommer

(57) ABSTRACT

A security system comprises many cameras (C1 to C128) and a large number of alarm detectors (AD1 to AD768). A system controller (2) associates alarm detectors with cameras. Views from the cameras (C) are displayed on monitors (M11 to M21). The views are displayed in any one of carious formats and any view can, in principle, be displayed on any monitor. At least some cameras have, or each camera has, a pan-and-tilt head (PT1 to PT128). Operators can control the pan-and-tilt heads (PT1 to PT128) and respond to alarms using control panels (CP1 to CP8). An operator may thus be faced with a large number of views. Views associated with active functions of the system are provided with coloured borders (B1, B2) to assist the operator. For example, views with active alarms are provided with flashing red borders (B1). Views associated with active control of a pan-and-tilt head (PT) by an operator are provided with a coloured border (B2) (e.g. green or yellow).

7 Claims, 4 Drawing Sheets

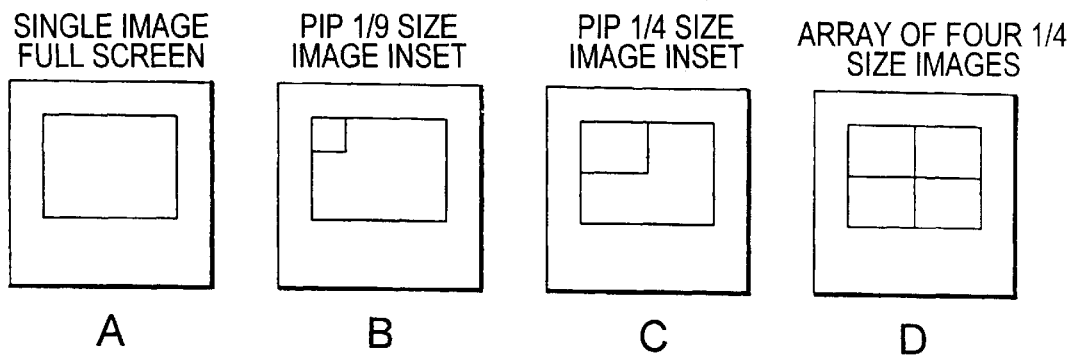
*Fig. 4*
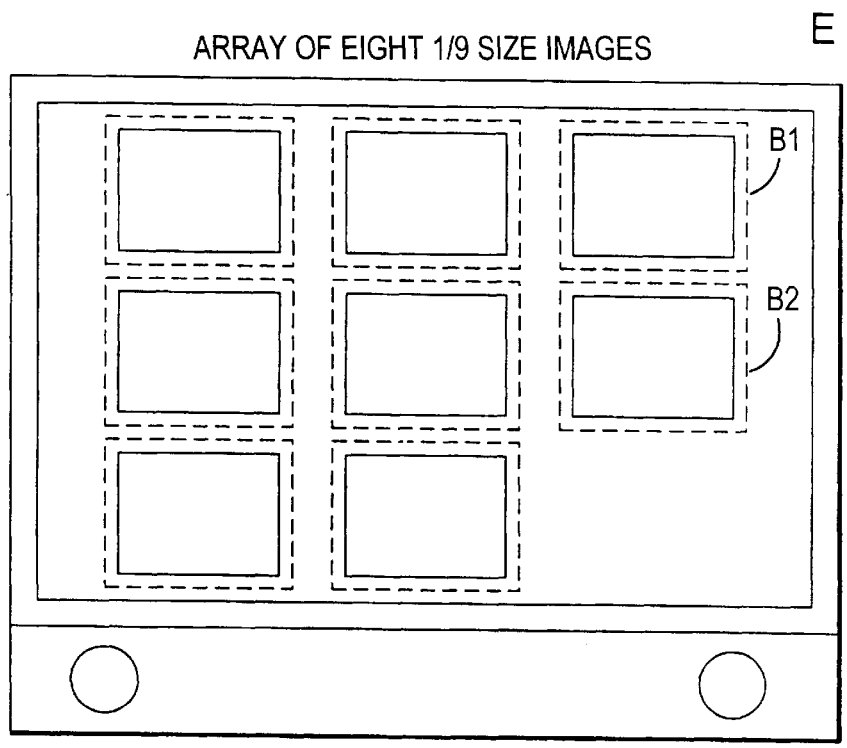

SECURITY CONTROL SYSTEM

BACKGROUND OF THE INVENTION

1. Field of the Invention

The present invention relates to a security control system. Illustrative embodiments of the invention relate to a security system comprising video cameras, the control system and monitors for displaying images received by the cameras.

2. Description of the Prior Art

Security CCTV systems are now finding widespread use in monitoring shopping centres, town centres, and commercial and industrial buildings.

The size of these systems may vary from one or two video sources for small retail outlets, petrol stations etc., and the large town centre installations which may have greater than a hundred video sources with hundreds of alarm input signals.

In large installations, a great deal of security information is provided to the operator for evaluation. Such large security systems are typically managed by a system controller which can: provide access to a large number of video sources (for example a hundred video sources) and many hundreds of alarm signals; allow control of pan and tilt heads for each camera; have provide some control panels (e.g. ten or fewer control panels) for enabling an operator to interact with the system; and present video information on some (e.g. 30 or more) video monitors.

Managing this information to ensure that any incident may be efficiently and effectively identified, dealt with and recorded for evidential purposes can be very operator intensive.

To improve the efficiency of the monitoring process, large security sites are often partitioned or broken down into areas, with one operator assigned responsibility for monitoring each area.

System controllers may provide the facilities to effectively partition an installation into a number, (e.g. eight) of fully functioning sub-systems. Each sub-system has a control interface, a number of video monitors, and access to a sub-set of the video sources and alarm information from the complete installation.

The monitors are watched by operators who use the control panels, e.g. in response to alarms, to control the views presented by the cameras in order to determine the cause of an alarm. Even by assigning one operator to each partition of an installation, an event may trigger many alarms and present the operator with an overwhelming amount of alarm and video information.

Other actions such as controlling pan-and-tilt heads can be confusing for the operator when he views many images on many monitors; it may be difficult to pick out the view which is subject to the pan-and-tilt control.

SUMMARY OF THE INVENTION

According to the present invention, there is provided a security system comprising:
- cameras for producing video signals representing images viewed thereby;
- display means for displaying the images; and
- control means for controlling the cameras, display means and implementing other system functions;
- the control means controlling the display of the images to visually indicate, in association with an image, an active system function associated with that image.

In preferred embodiments of the invention, the visual indicator is a coloured border. The border may provide further emphasis by flashing. Different coloured borders may be used to indicate different function, e.g. a red border indicates an alarm condition.

The above, and other objects, features and advantages of this invention will apparent from the following detailed description of illustrative embodiments which is to be read in connection with the accompanying drawings.

BRIEF DESCRIPTION OF THE DRAWINGS

FIG. 4 is a schematic diagram of illustrative display modes.

DESCRIPTION OF THE PREFERRED EMBODIMENTS

Figure 1:
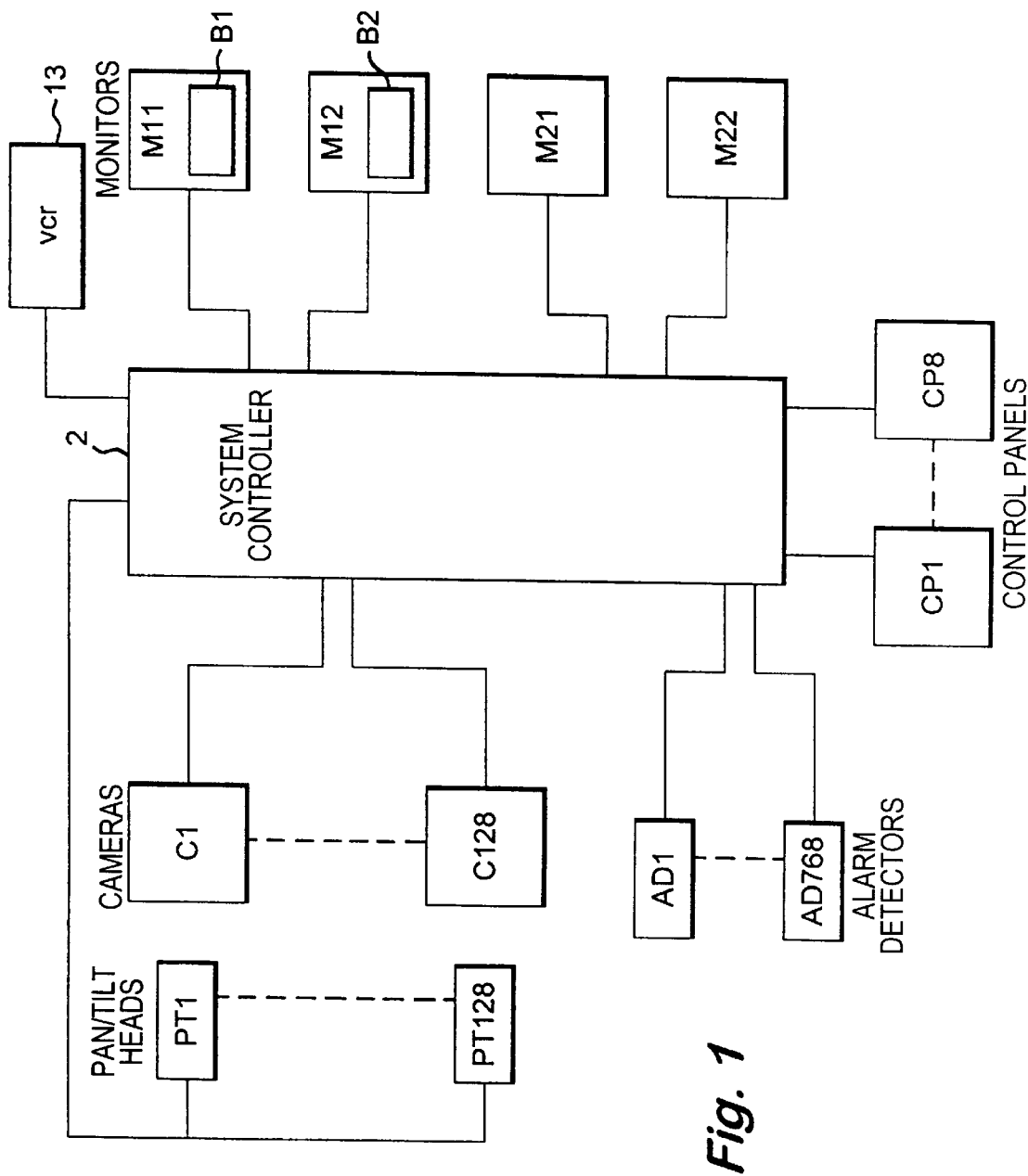
FIG. 1 is a schematic block diagram of an illustrative security system in which aspects of the present invention are implemented.

Referring to FIG. 1 an illustrative security system in accordance with the present invention comprises 128 cameras C1–C128. At least some, and in this example all, of the cameras have pan and tilt heads PT1–PT128. The system also comprises 768 alarm detectors AD1–AD768.

A system controller 2 receives analogue video from the cameras C1–C128, and alarm signals from the alarm detectors AD1–AD768. The controller 2 provides control signals to the pan and tilt heads.

Up to eight control panels CP1 to CP8 are provided. There may be more than eight panels. The control panels CP1–CP8 are used to program the system controller 2 and also are used by operators to control the system in use. For example, an operator can select a particular pan-and-tilt head and control it using the control panel.

The controller 2 controls in accordance with its programming the display of video from the cameras, and the display of alarms, on four monitors M11, M12, M21, M22.

The system of FIG. 1 also includes one or more video cassette recorders (VCR) 13 for recording events such as evidence of intruders into a building. The operator chooses a view to be recorded and the system control then feeds the appropriate video signal to the VCR 13.

Figure 2:
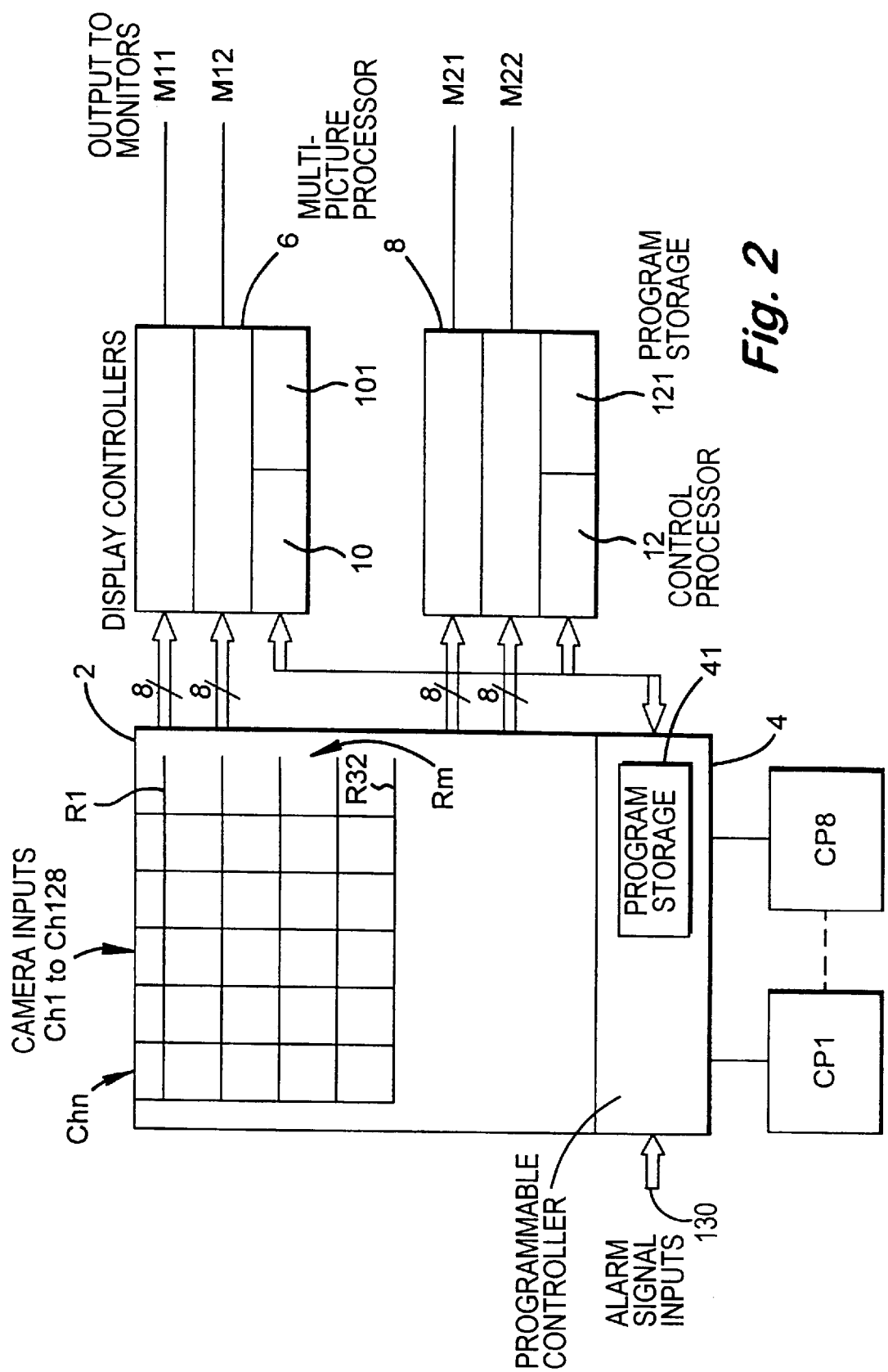
FIG. 2 is a more detailed block diagram of the system controller of the system of FIG. 1.

Referring to FIG. 2, the system controller 2 comprises a video switcher having 128 analogue video inputs and 32 analogue video outputs. The inputs are shown as (vertical) columns Chn, Ch1–Ch128 in FIG. 2, and the outputs as horizontal rows Rm, R1–R32. Video switches are controlled by a programmable controller 4, e.g a special purpose data processor or computer including program storage means 41 to connect the columns Chn to the rows Rm in any desired configuration. In addition, the connections may be varied in time.

The 32 outputs R1 to R32 are organised into four groups of eight outputs. One pair of groups or 16 outputs feed analogue video to a first multi-picture processor 6 and the other pair of groups or 16 outputs feed analogue video to a second multi-picture processor 8.

Each multi-picture processor 6, 8, comprises two identical channels both controlled by a common control processor 10, 12 having a program storage means 101, 121. Each channel processes one group of eight analogue video inputs Ri to Ri+7 e.g. R1–R8.

The monitors M11 M12 are controlled by the two channels respectively of processor 6 and the monitors M21 and M22 are controlled by the two channels of processor 8.

The control processors 10, 12 are linked to the programmable controller 4 to control the display of information on the monitors in accordance with the programming of the controller 4. Programming of the controller 4 correspondingly programs the control processors 10 and 12.

Figure 3:
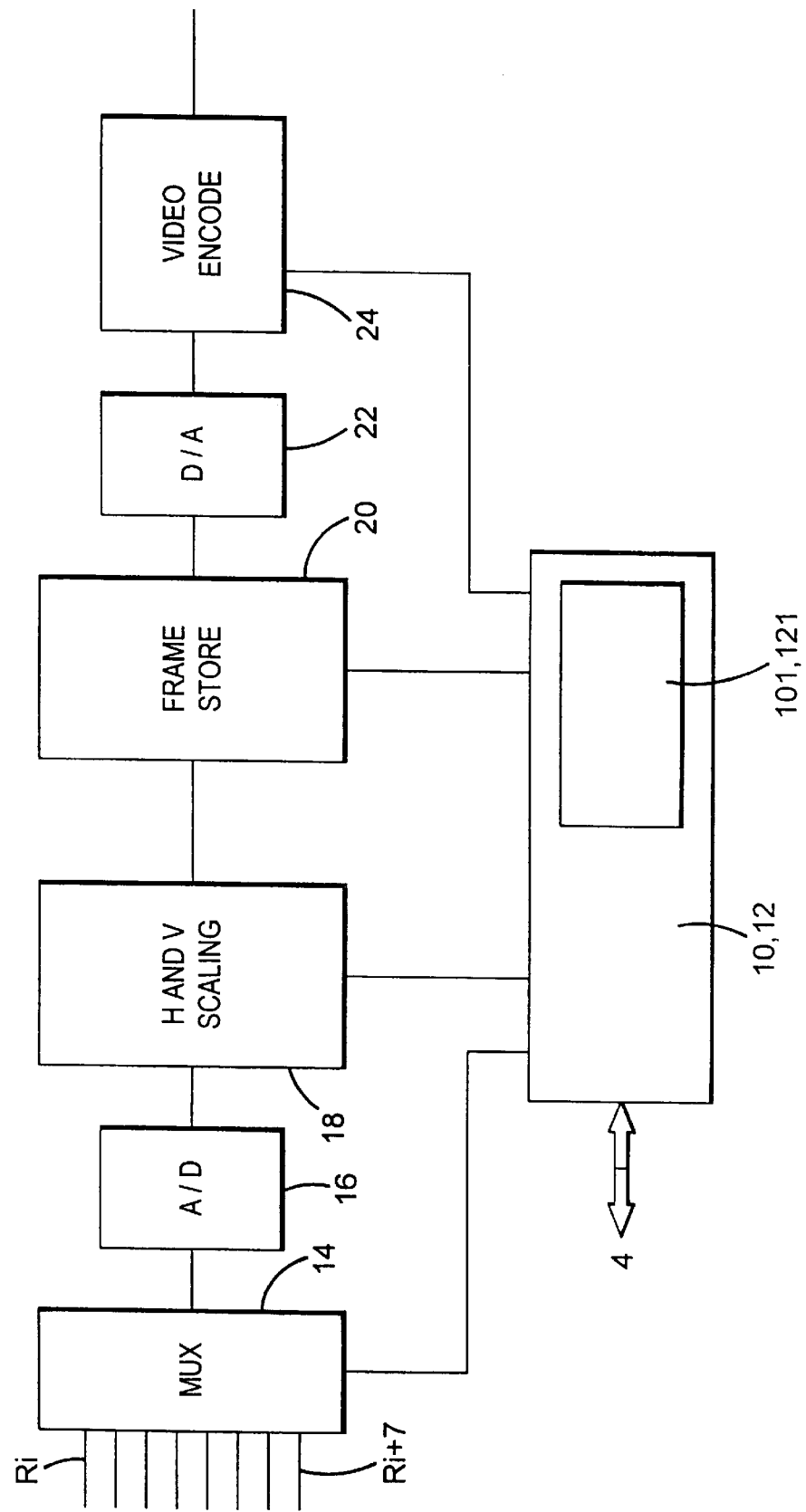
FIG. 3 is a schematic block diagram of a video signal processing channel associated with one monitor of the system of FIGS. 1 and 2.

Referring to FIG. 3 each channel of the multipicture processors comprises a multiplexer 14 having eight inputs corresponding to one group of video outputs Ri–Ri+7 and one output. The multiplexer 14 is controlled by the control processor 10, 12 to feed any selectable one of the inputs R1–Ri+7 to an analogue to digital converter 16. The resulting digital video is fed to a circuit 18 which under the control of the processor 10, 12 scales the video horizontally and vertically to produce an image of desired size (e.g. full screen, ¼ size, ⅑ size).

The thus scaled image is stored in a frame store 20 under the control of the processor 10, 12. The processor 10, 12 controls the write addresses of the store to position the scaled image in a desired position for display, to allow picture-in-picture displays (PIP displays) or a desired number of pictures to be displayed in an array of pictures e.g. four or eight pictures on one monitor, as will be described hereinbelow.

The image or images stored in the frame store 20 are read-out via a digital to analogue converter 22 to a video encoder 24. The video encoder 24 encodes the video to be compatible with the monitors M11, M12, M21, M22. The video encoder 24 is also controlled by the processor 10, 12 to carry out other functions as will be described hereinbelow.

The system described herein above may operate on monochrome video signals. Alternatively colour video signals may be processed. Although the cameras produce analogue signals, the system could be modified to operate on digital signals produced by the cameras.

A preferred version of the system, as shown in FIG. 1 includes the 768 alarm detectors. The programmable controller 4 includes in its program store 41 a look-up table which is programmable to associate the cameras with one or more, e.g. a group of 4, alarm detectors AD.

In one mode of operation of the system, a set of images is displayed on a display device and the operator selects one of the images for performing an operation linked to that image. For example, he may select the image to access a further set of images linked to the selected image.

In this example of the present invention, images which are displayed on the monitors M11 to M22 and which are subject to certain predetermined actions or active events are made visually prominent to the operator in a way which represents the action or event. In this illustrative example this is done by providing coloured borders B1, B2 around the displayed images associated with such actions and events. For example:

| Action/Event | Border |
| --- | --- |
| Alarm | Red |
| Pan-and-tilt control | Yellow |

| Action/Event | Border |
| --- | --- |
| VCR recording | Blue |
| Normal (no action/event) | White |
| Image selected for performing further operation | Green |

For an alarm, the red border may flash.

The borders may be written into the image frame in the frame store by the control processor 10, 12 in response to the action or event which is assigned to it by the controller 4. Preferably, the borders are combined with the video in the video encoder 24.

In preferred embodiments of the invention, the multipicture processors 8, 6 display one or more images in any one of the formats shown in FIGS. 4A to 4E.

| Format | Display |
| --- | --- |
| A | Single image, full screen |
| B | PIP, ⅑ size image inset |
| C | PIP, ¼ size image inset |
| D | Array of four ¼ size images |
| E | Array of eight ⅑ size images |

As shown in FIG. 4E, by way of example, all eight images have a border. The colour the border of an image is varied according to the actions and events associated with that image.

In an illustrative, preferred, embodiment, operator fatigue is reduced and operational efficiency increased by presenting the information more concisely on four monitors and by highlighting important information by the use of coloured borders.

In summary of the above described embodiments a security system comprises many cameras (C1 to C128) and a large number of alarm detectors (AD1 to AD768). A system controller (2) associates alarm detectors with cameras. Views from the cameras (C) are displayed on monitors (M11 to M21). The views are displayed in any one of various formats and any view can, in principle, be displayed on any monitor. At least some cameras have, or each camera has, a pan-and-tilt head (PT1 to PT128). Operators can control the pan-and-tilt heads (PT1 to PT128) and respond to alarms using control panels (CP1 to CP8). An operator may thus be faced with a large number of views. Views associated with active functions of the system are provided with visual emphasis, e.g. coloured borders (B1, B2) to assist the operator. For example, views with active alarms are provided with flashing red borders (B1). Views associated with active control of a pan-and-tilt head (PT) by an operator are provided with a coloured border (B2) (e.g. green or yellow).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A security system, comprising:
   cameras for producing video signals representing images viewed thereby;
   display means for displaying the images; and
   control means for controlling the cameras, display means and implementing other system functions, said control means controlling the display of the images, in response to an active function, to visually indicate, in association with an image, the active system function associated with that image, wherein the visual indication is a border around the image, the color of the border indicating the active function associated with the image.

2. A system according to claim 1, wherein the border flashes.

3. A system according to claim 1, comprising at least one alarm detector, associated with at least one camera for producing an alarm signal production of an alarm signal associated with an image key on active system function.

4. A system according to claim 3, wherein an alarm associated with an image is indicated by a red border.

5. A system according to claim 3, wherein an alarm associated with an image is indicated by a flashing border.

6. A system according to claim 1, wherein the system comprises at least one pan-and-tilt heads associated with at least one of the cameras, and the active function is control of a pan-and-tilt head.

7. A system according to claim 1, wherein the system comprises a video cassette recorder and the active function is actuation of the recorder.

* * * * *